United States Patent
Lu et al.

(10) Patent No.: US 9,244,246 B2
(45) Date of Patent: Jan. 26, 2016

(54) WAFER LEVEL DEVICE AND WAFER LEVEL LENS WITH CONCAVE AND CONVEX MODELING

(71) Applicant: HIMAX TECHNOLOGIES LIMITED, Tainan (TW)

(72) Inventors: Yin-Dong Lu, Tainan (TW); Han-Yi Kuo, Tainan (TW)

(73) Assignee: HIMAX TECHNOLOGIES LIMITED, Fonghua Village, Xinshi Dist., Tainan (TW)

( * ) Notice: Subject to any disclaimer, the term of this patent is extended or adjusted under 35 U.S.C. 154(b) by 316 days.

(21) Appl. No.: 13/802,817

(22) Filed: Mar. 14, 2013

(65) Prior Publication Data

US 2014/0268372 A1    Sep. 18, 2014

(51) Int. Cl.
*G02B 7/02* (2006.01)
*G02B 13/00* (2006.01)

(52) U.S. Cl.
CPC ............ *G02B 7/021* (2013.01); *G02B 13/0085* (2013.01)

(58) Field of Classification Search
CPC .... G02B 7/021; G02B 13/0085; G02B 7/022; G02B 3/0062
See application file for complete search history.

(56) References Cited

U.S. PATENT DOCUMENTS

| 4,662,717 | A * | 5/1987 | Yamada et al. | 359/362 |
| 8,587,882 | B2 * | 11/2013 | Wippermann et al. | 359/811 |
| 2004/0047274 | A1 * | 3/2004 | Amanai | 369/125 |
| 2005/0286143 | A1 | 12/2005 | Chen | |

FOREIGN PATENT DOCUMENTS

| TW | 200600870 | 1/2006 |
| TW | M299861 | 10/2006 |
| TW | 201239502 | 10/2012 |

* cited by examiner

*Primary Examiner* — Joseph P Martinez
(74) *Attorney, Agent, or Firm* — Winston Hsu; Scott Margo

(57) ABSTRACT

An exemplary wafer level device includes a first wafer and a second wafer. The first wafer has a concave modeling, and the second wafer has a convex modeling, wherein the first wafer and the second wafer are combined together by the concave modeling being engaged with the convex modeling. An exemplary wafer level lens includes a first wafer level lens and a second wafer level lens. The first wafer level lens has a concave modeling, and the second wafer level lens has a convex modeling, wherein the first wafer level lens and the second wafer level lens are combined together by the concave modeling being engaged with the convex modeling.

15 Claims, 6 Drawing Sheets

WAFER LEVEL DEVICE AND WAFER LEVEL LENS WITH CONCAVE AND CONVEX MODELING

BACKGROUND OF THE INVENTION

1. Field of the Invention

The disclosed embodiments of the present invention relate to a wafer level device having two wafers engaged together, and more particularly, to a wafer level lens having two lenses combined together through a concave modeling engaged with a convex modeling.

2. Description of the Prior Art

Wafer level camera module is a very attractive technique for apparatuses like handheld mobile devices. It results in the smaller occupied camera module size, especially compared with the conventional camera lens. A wafer level lens is an important component of the wafer level camera module, and the complexity raises along with the demand for high pixel resolution and some other special requirements, for instance, a wide angle lens. Generally, optical glasses and glues are stacked up layer by layer to form a wafer level lens module. In theory, the performance of the lens module upgrades as the number of optical glasses rises. Conventionally, two wafer level lenses would be glued to each other and then be cut, thus defects are easy to happen.

That is to say, the alignment of glass elements is a troublesome issue. Especially high accuracy is an extreme requirement in an optical system. The de-centered lens would result in symptoms including "glowing" highlights, or an uneven distribution of sharpness. Thus, there is a need for an innovative wafer level lens design which is capable of avoiding the de-centering issue for improving the accuracy of the wafer level lens.

SUMMARY OF THE INVENTION

In accordance with exemplary embodiments of the present invention, a wafer level device having two lenses combined together by a concave modeling engaged with a convex modeling is proposed to solve the above-mentioned problem.

According to a first aspect of the present invention, an exemplary wafer level device is disclosed. The exemplary wafer level device includes a first wafer, having a concave modeling; and a second wafer, having a convex modeling; wherein the first wafer and the second wafer are combined together by the concave modeling being engaged with the convex modeling.

According to a second aspect of the present invention, an exemplary wafer level lens is disclosed. The exemplary wafer level lens includes a first wafer level lens, having a concave modeling; and a second wafer level lens, having a convex modeling; wherein the first wafer level lens and the second wafer level lens are combined together by the concave modeling being engaged with the convex modeling.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
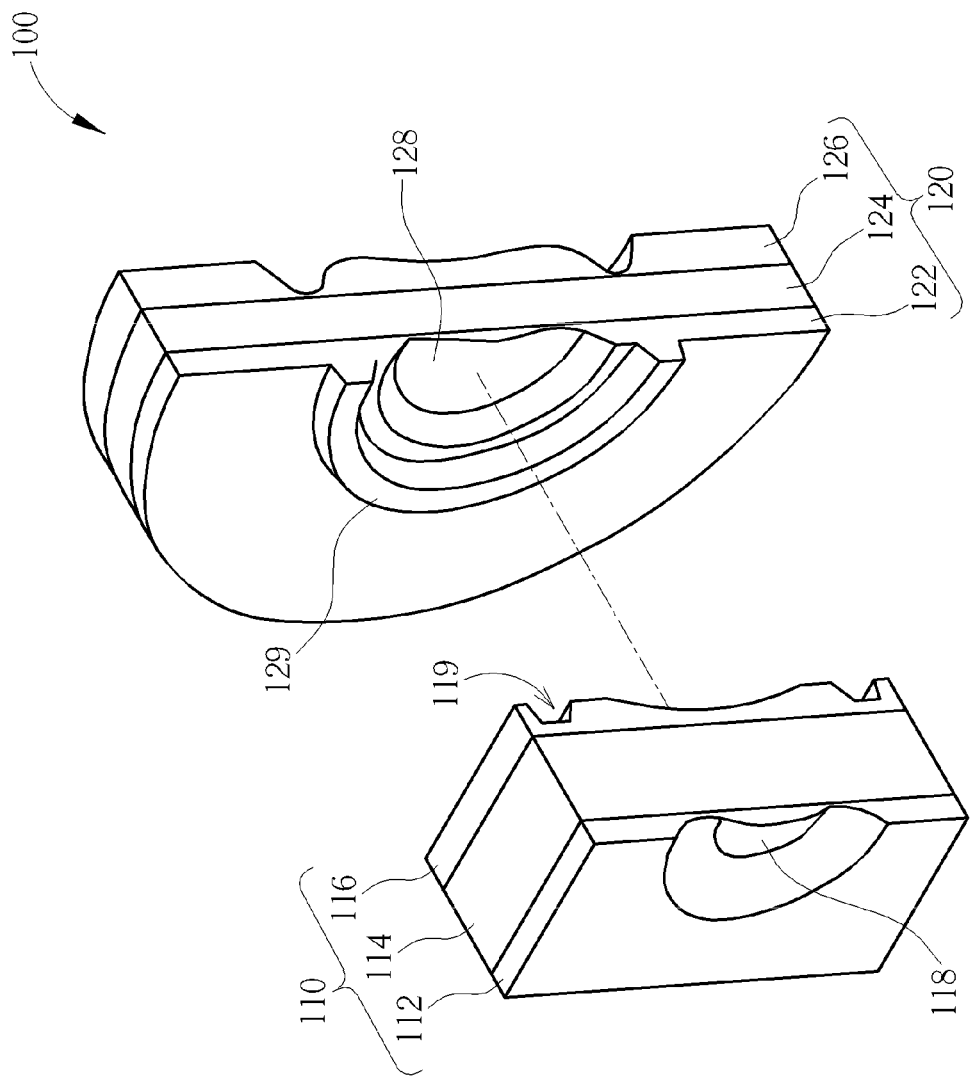
FIG. 1 is a cross-sectional diagram of a wafer level lens module according to an exemplary embodiment of the present invention.

Please refer to FIG. 1, which is a cross-sectional diagram of a wafer level lens module according to an exemplary embodiment of the present invention. The wafer level lens module 100 comprises a plurality of wafer level lenses, including a first wafer level lens 110 and a second wafer level lens 120. The first wafer level lens 110 includes a first glue layer 112, a glass layer 114, a second glue layer 116, an optical lens part 118, and a concave modeling 119 on the second glue layer 116. The second wafer level lens 120 includes a first glue layer 122, a glass layer 124, a second glue layer 126, an optical lens part 128, and a convex modeling 129 on the first glue layer 122. The first wafer level lens 110 and the second wafer level lens 120 are combined to form the wafer level lens module 100. In addition, the optical lens part 118 of the glass layer 114 of the first wafer level lens 110 should be optimized in its alignment with the optical lens part 128 of the glass layer 124 of the second wafer level lens 120 to a sweet center spot to give the best center and corner-corner resolution. Thus, the concave modeling 119 of the second glue layer 116 of the first wafer level lens 110 could be accurately engaged with the convex modeling 129 of the first glue layer 122 of the second wafer level lens 120 to avoid de-centering.

Figure 2:
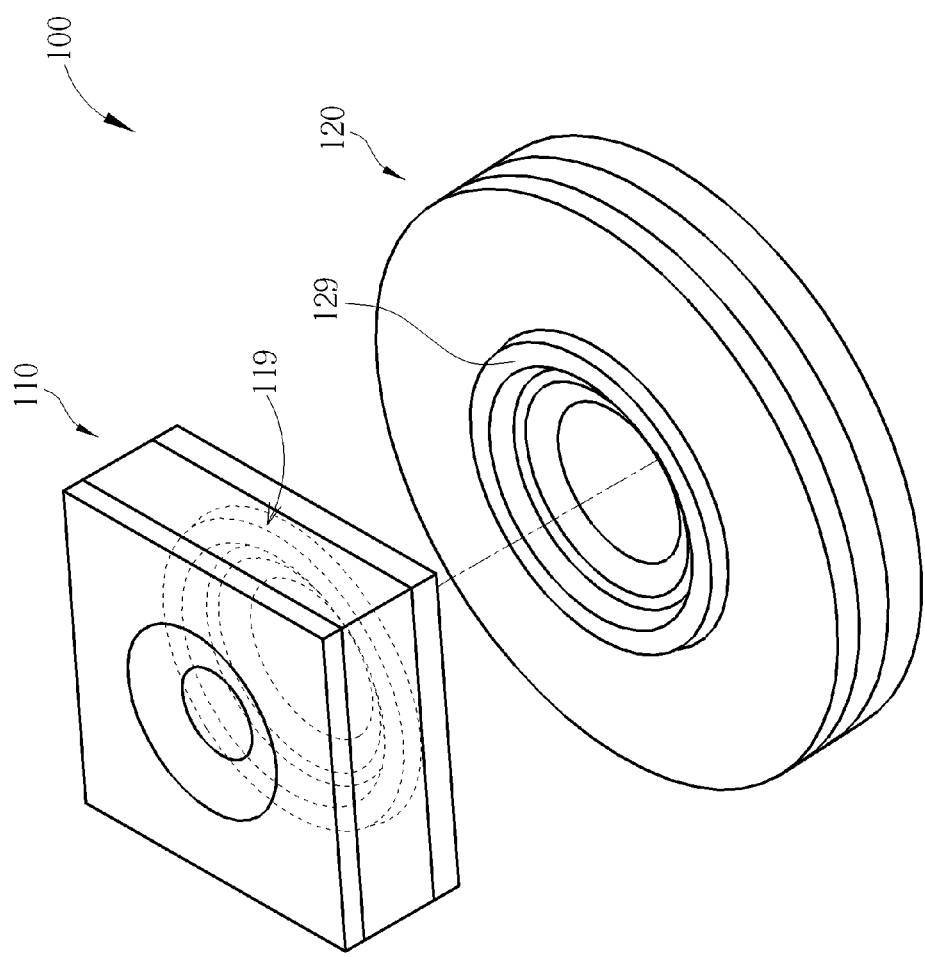
FIG. 2 is a perspective diagram of the wafer level lens module shown in FIG. 1.

Please refer to FIG. 1 in conjunction with FIG. 2. FIG. 2 is a perspective diagram of the wafer level lens module 100 shown in FIG. 1. The concave modeling 119 of the first wafer level lens 110 is a continuous ring which could be used to engage with the convex modeling 129 of the second wafer level lens 120, wherein the convex modeling 129 is also a continuous ring. The design of the continuous ring ensures the optical center of the first wafer level lens 110 to coincide with the optical center of the second wafer level lens 120, and rotation of each of the two lens would not introduce de-centering due to the geometrical centers of the two lens are fixed points and would not be shifted by rotation.

Figure 3:
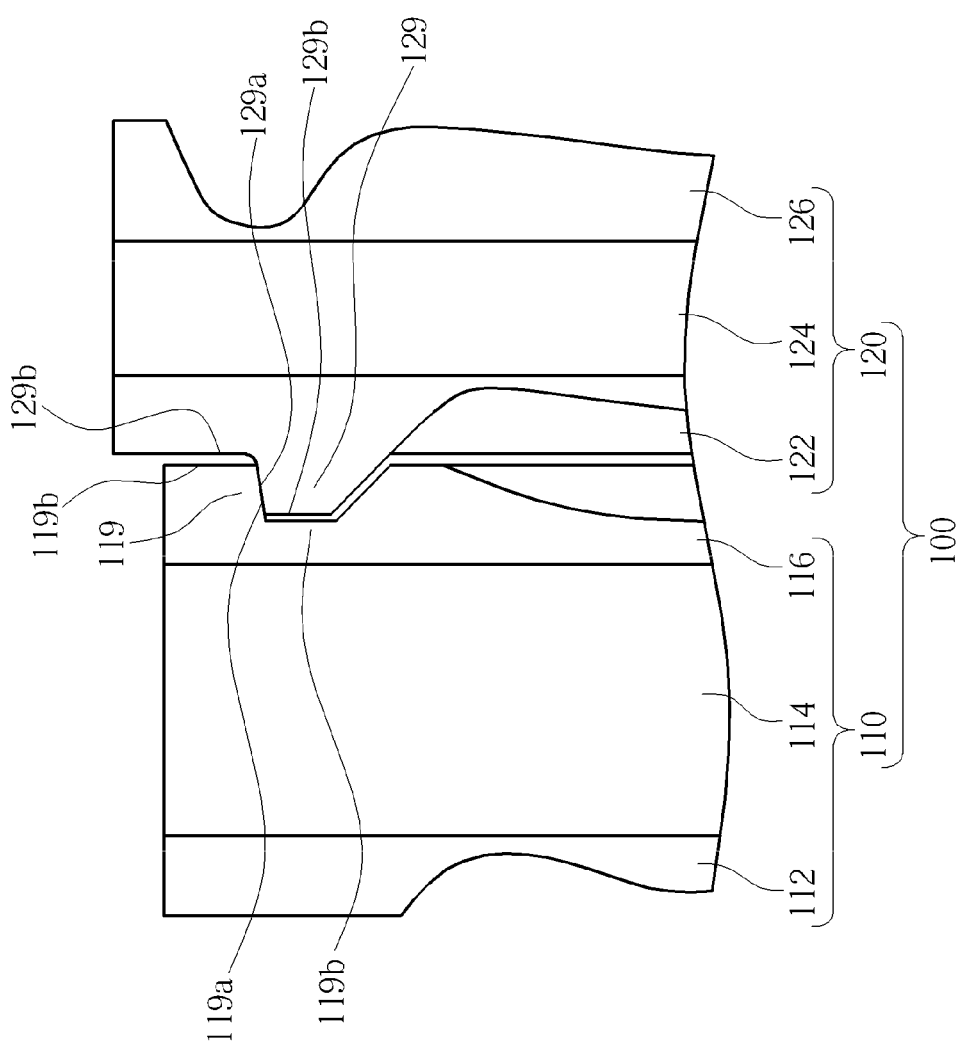
FIG. 3 is another cross-sectional diagram of the wafer level lens module shown in FIG. 1.

Please refer to FIG. 1 in conjunction with FIG. 3. FIG. 3 is another cross-sectional diagram of the wafer level lens module 100 shown in FIG. 1. As shown in FIG. 3, a section of the continuous ring 119 of the first wafer level lens 110 is a concave trapezoid, and a section of the continuous ring 129 of the second wafer level lens 120 is a convex trapezoid. The trapezoid design would help the two wafer level lenses to be more easily combined together without slippage or shift after engagement. Please note that the design of the concave ring 119 and the convex ring 129 may be implemented using any feasible geometrical structure (e.g., inter alia, a ring with a triangle, semicircular, Rectangular section, or a square ring with a semicircular section) which can make the first wafer level lens 110 and the second wafer level lens 120 engaged with each other, that is to say, any design using a concave modeling and a convex modeling to make the first wafer level lens 110 and the second wafer level lens 120 combine together falls within the scope of the present invention.

In FIG. 3, a contact surface 119*a* of the concave ring 119 and a contact surface 129*a* of the convex ring 129 are designed for engagement, in addition, a surface 119*b* and a surface 129*b* are opposite surfaces with space therein, which improves the accuracy of combination of the first wafer level lens 110 and the second wafer level lens 120. Moreover, any glue may be used to fix the first wafer level lens 110 and the second wafer level lens 120.

Figure 4:
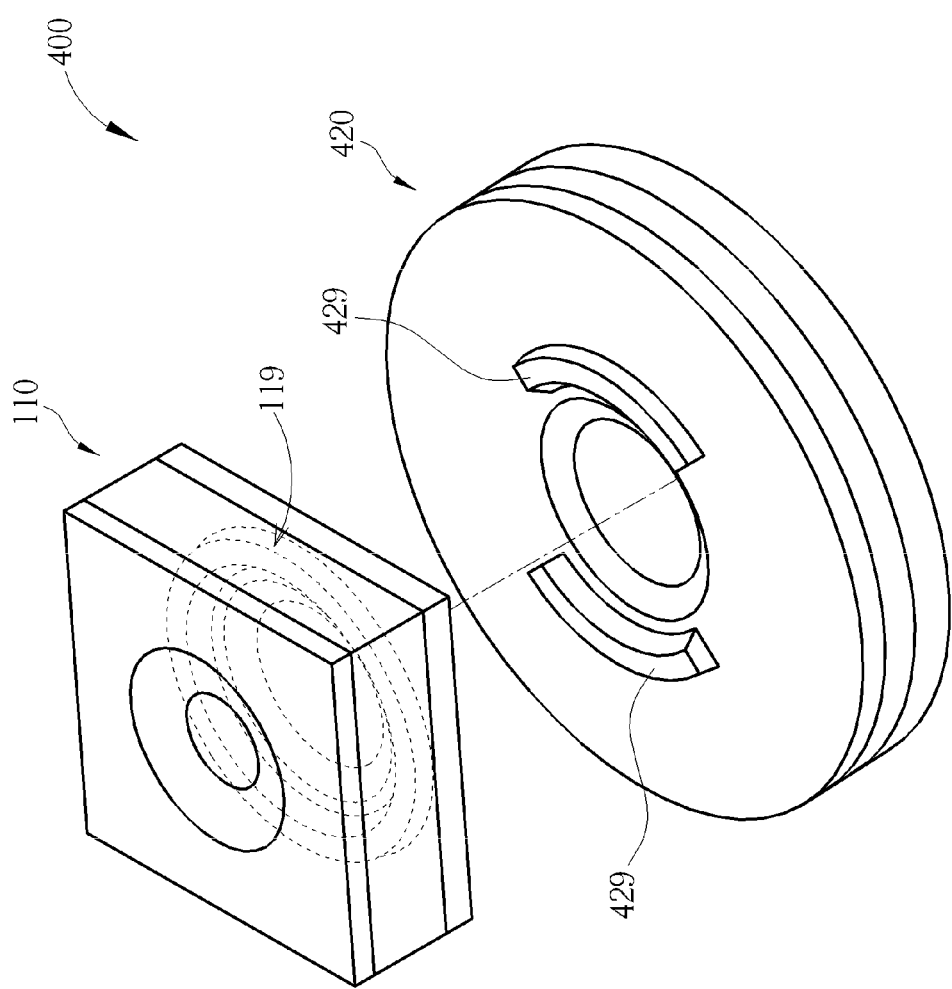
FIG. 4 is a perspective diagram illustrating a wafer level lens module according to another embodiment of the present invention.
Figure 5:
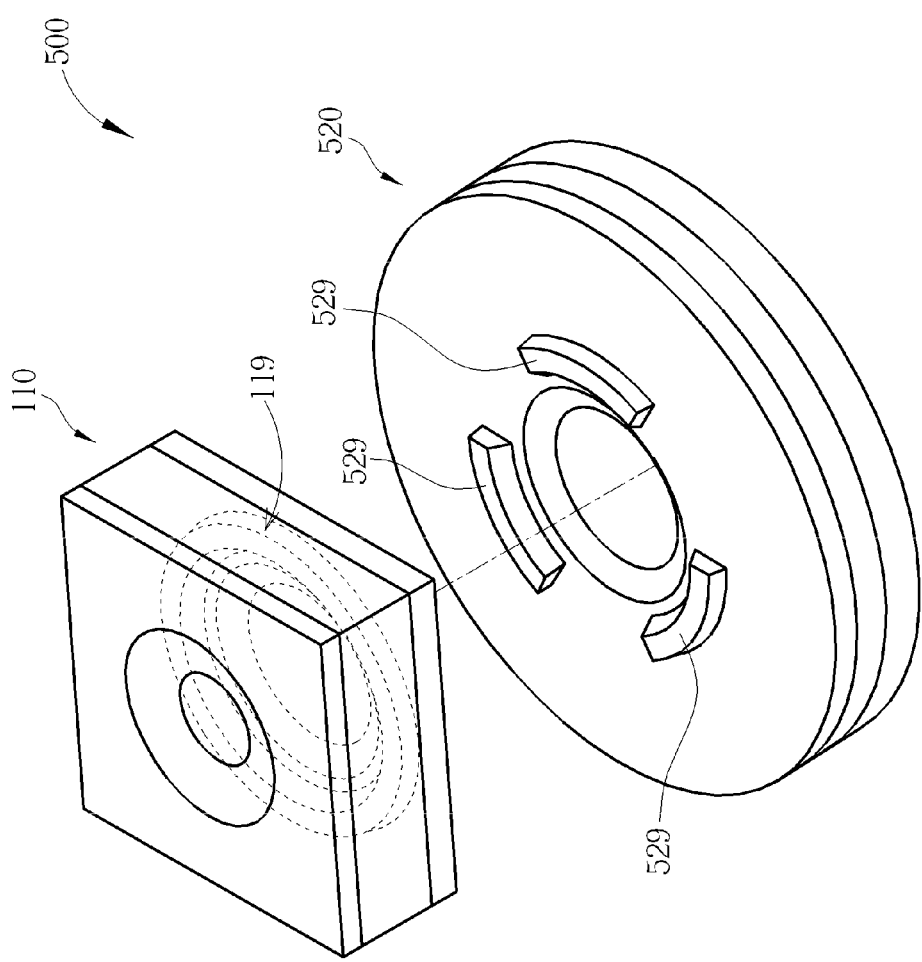
FIG. 5 is a perspective diagram illustrating a wafer level lens module according to another embodiment of the present invention.
Figure 6:
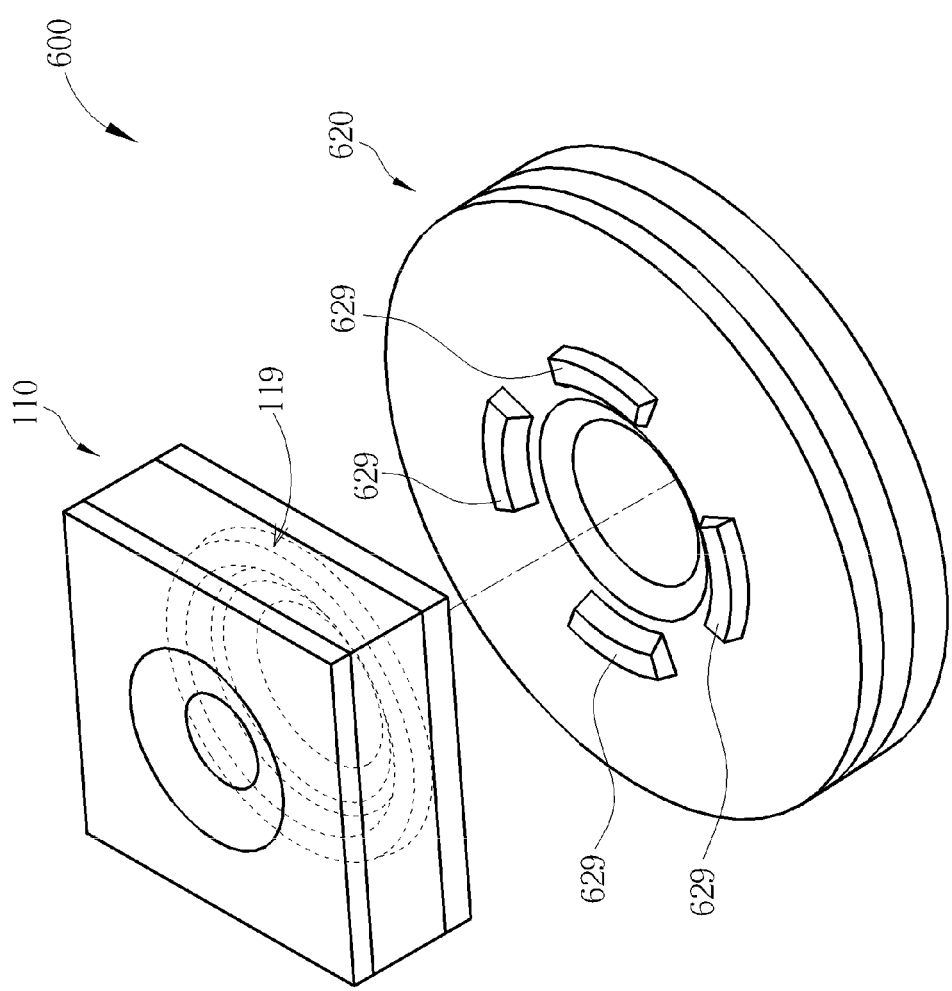
FIG. 6 is a perspective diagram illustrating a wafer level lens module according to another embodiment of the present invention.

Please refer to FIG. 4, which is a diagram illustrating a wafer level lens module according to another embodiment of the present invention. The wafer level lens module 400 comprises a plurality of wafer level lenses, including a second wafer level lens 420 and the aforementioned first wafer level lens 110. The concave modeling 119 of the first wafer level lens 110 is a continuous ring which could be used to engage with the convex modeling 429 of the second wafer level lens 420, wherein the convex modeling 429 is a discontinuous ring, which is a part of the continuous ring 129 of the second wafer level lens 120 shown in FIG. 2. The design of the discontinuous ring also ensures the optical center of the first wafer level lens 110 coincides with the optical center of the second wafer level lens 420, and rotation of each of the two lenses would not introduce de-centering due to the geometrical centers of the two lenses are fixed points and would not be shifted by rotation. Please refer to FIG. 5 and FIG. 6, which are embodiments illustrating wafer level lens modules 500, 600 each having a different discontinuous ring acting as a convex modeling 529, 629 on the second wafer level lens 520, 620. As a person skilled in the art can readily understand details of the wafer level lens modules 500, 600 after reading above paragraphs, further description is omitted here for brevity.

It should be noted that the concave modeling and the convex modeling could be set in a contrary way from the aforesaid embodiments (e.g., a convex modeling on the first wafer level lens 110 and a concave modeling on the second wafer level lens 120), and designs of the concave modeling and the convex modeling might be used in any wafer level device to combine wafers (i.e., not limit to a wafer level lens). Moreover, the number of the wafer level lens is not limited to 2. These alternative designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wafer level device, comprising:
    a first wafer, wherein before the first wafer is combined with a second wafer, a surface of the first wafer has a first glue layer, and the first glue layer has a concave modeling; and
    the second wafer, wherein before the second wafer is combined with the first wafer, a surface of the second wafer has a second glue layer, and the second glue layer has a convex modeling;
    wherein the first wafer and the second wafer are combined together by the concave modeling being engaged with the convex modeling.

2. The wafer level device of claim 1, wherein the concave modeling of the first wafer is a continuous ring.

3. The wafer level device of claim 2, wherein a section of the continuous ring of the first wafer is a concave trapezoid.

4. The wafer level device of claim 1, wherein the convex modeling of the second wafer is a continuous ring.

5. The wafer level device of claim 4, wherein a section of the continuous ring of the second wafer is a convex trapezoid.

6. The wafer level of chimera of claim 1, wherein the convex modeling of the second wafer is a discontinuous ring.

7. The wafer level device of claim 6, wherein a section of the discontinuous ring of the second wafer is a convex trapezoid.

8. A wafer level lens, comprising:
    a first wafer level lens, wherein before the first wafer level lens is combined with a second wafer level lens, a surface of the first wafer level lens has a first glue layer, and the first glue layer has a concave modeling; and
    the second wafer level lens, wherein before the second wafer level lens is combined with the first wafer level lens, a surface of the second wafer level lens has a second glue layer, and the second glue layer has a convex modeling;
    wherein the first wafer level lens and the second wafer level lens are combined together by the concave modeling being engaged with the convex modeling.

9. The wafer level lens of claim 8, wherein the concave modeling of the first wafer level lens is a continuous ring.

10. The wafer level lens of claim 9, wherein a section of the continuous ring of the first wafer level lens is a concave trapezoid.

11. The wafer level lens of claim 8, wherein the convex modeling of the second wafer level lens is a continuous ring.

12. The wafer level lens of claim 11, wherein a section of the continuous ring of the second wafer level lens is a convex trapezoid.

13. The wafer level lens of chimera of claim 8, wherein the convex modeling of the second wafer level lens is a discontinuous ring.

14. The wafer level lens of claim 13, wherein a section of the discontinuous ring of the second wafer level lens is a convex trapezoid.

15. A method for forming a wafer level device, comprising:
    providing a first wafer, wherein a surface of the first wafer has a first glue layer, and the first glue layer has a concave modeling;
    providing a second wafer, wherein a surface of the second wafer has a second glue layer, and the second glue layer has a convex modeling; and
    combining the first wafer and the second wafer by putting the convex modeling of the second glue layer into the concave modeling of the first glue layer.

* * * * *